United States Patent [19]

Bilz et al.

[11] 4,425,060
[45] Jan. 10, 1984

[54] MACHINE TOOL CHUCK

[75] Inventors: Reiner Bilz, Esslingen; Otto Fauth, Ostfildern, both of Fed. Rep. of Germany

[73] Assignee: Otto Bilz Werkzeugfabrik Kommandit-Gesellschaft, Ostfildern, Fed. Rep. of Germany

[21] Appl. No.: 315,991

[22] Filed: Oct. 28, 1981

[30] Foreign Application Priority Data

Dec. 10, 1980 [DE] Fed. Rep. of Germany ....... 3046485

[51] Int. Cl.³ .................. B23B 47/24; B23B 49/00; B23B 5/00; B23B 31/10
[52] U.S. Cl. ............................. 408/6; 408/16; 279/4
[58] Field of Search ............ 92/8, 9; 279/4; 200/4, 200/237, 238, 239; 408/6, 16, 10

[56] References Cited

U.S. PATENT DOCUMENTS

| | | | |
|---|---|---|---|
| 3,073,347 | 1/1963 | Bent et al. | 200/4 |
| 3,299,697 | 1/1967 | Sparling | 408/6 |
| 3,460,015 | 8/1969 | Hines | 408/16 |
| 3,587,361 | 6/1971 | Smith | 408/16 |
| 3,627,437 | 12/1971 | Smith | 408/16 |
| 3,652,099 | 3/1972 | Bilz | 408/16 |
| 3,772,484 | 11/1973 | Roeser | 200/4 |
| 4,090,802 | 5/1978 | Bilz | 408/6 |
| 4,304,511 | 12/1981 | Machida | 408/6 |

Primary Examiner—E. R. Kazenske
Assistant Examiner—Paul M. Heyrana, Sr.
Attorney, Agent, or Firm—Michael J. Striker

[57] ABSTRACT

A chuck for drilling tools is formed with a hollow shank which can be accommodated in a machine spindle, and is provided with a sleeve, which is adapted for accommodating a quick-change insert in the form of a tool or serves to accommodate a tool and which is coupled with the shank through an adjustable torque clutch device which, in the event of an overload, automatically disengages along with an axial relative displacement between the shank and the sleeve. The chuck has a high-frequency transmission device which is provided with a current source of its own, a high-frequency transmitter, a switch, which is closable during the axial relative movements between the shank and the sleeve, in the current supply circuit of the high-frequency transmitter and an external aerial ring. The shank interior which contains the high-frequency transmission device including the current source, transmitter and switch is sealed in both axial end zones of the high-frequency transmission device, as well as at the aerial ring, which seats on the shank, over the exterior thereof.

21 Claims, 1 Drawing Figure

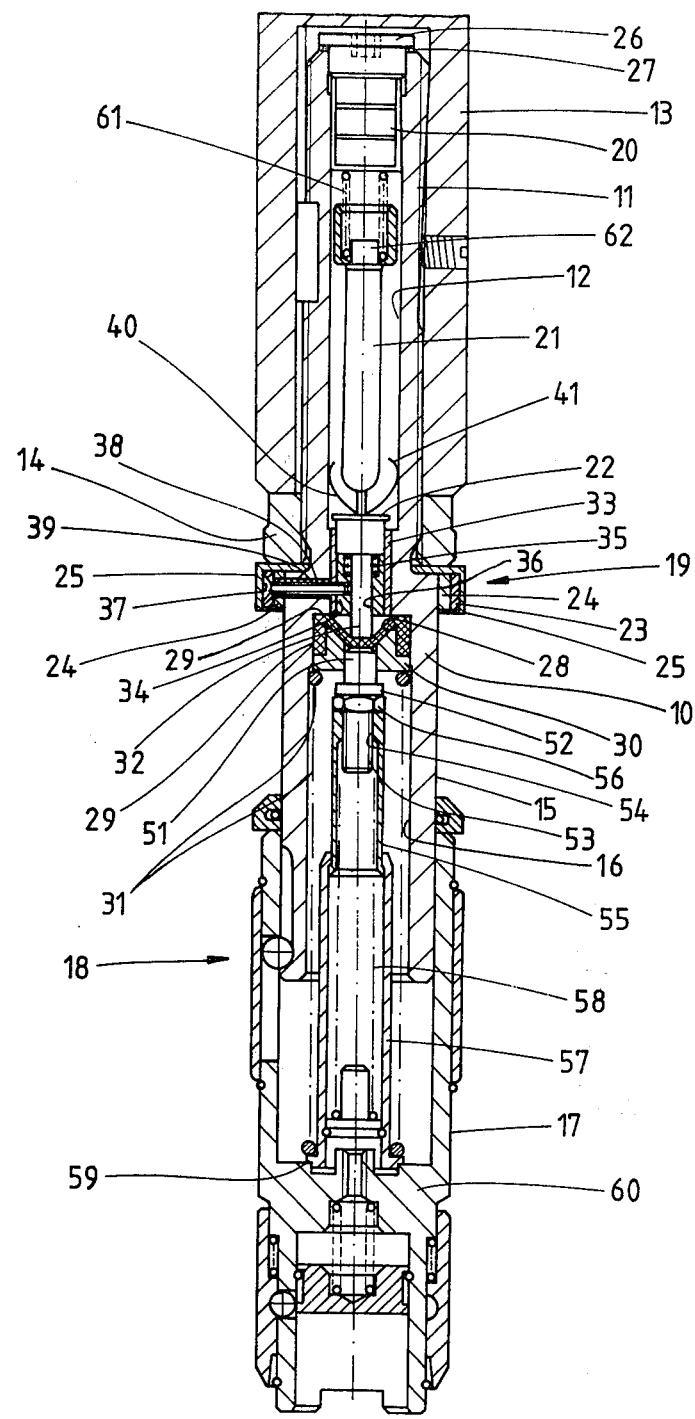

MACHINE TOOL CHUCK

BACKGROUND TO THE INVENTION

The invention relates to a chuck which is intended, more especially, for drilling tools and having a hollow shank which can be accommodated in a machine spindle, and is provided with a sleeve, which is adapted for accommodating a quick-change insert in the form of a tool or serves to accommodate a tool and which is coupled with the shank through an adjustable torque clutch device which, in the event of an overload, automatically disengages along with an axial relative displacement of the shank and the sleeve. The chuck has a high-frequency transmission device which is provided with a current source of its own, a high-frequency transmitter, a switch, which is closable during the axial relative movements between the shank and the sleeve, in the current supply circuit of the high-frequency transmitter and an external aerial ring.

STATEMENT OF PRIOR ART

Such a chuck is mainly designed as a quick-change chuck for accommodating drills, taps, etc., the chuck being adapted so that either the drilling tools are clamped by means of a special quick-change insert which, for its part, is quickly and easily accommodated in the chuck. This design is known (U.S. Pat. Nos. 3,723,017; 4,090,802). The torque clutch device thereof is designed, for example, as an axial safety clutch responding to compressive forces and tensile forces. If the thrust for feeding respectively set is exceeded, this safety clutch responds and disengages the drive of the sleeve from the shank, which continues to be driven by the machine, so that damage to, more especially a breakage of, the drilling tool as well as an impairment or the destruction of the workpiece are prevented. For, during machining by drilling, it happens at intervals of time that the drilling tool becomes blunt during the course of machining and therefore no longer cuts or that for some reason or other the drilled hole is not drilled sufficiently deeply, caused either by a reduction in the cutting force of the drilling tool or by chip clogging of the drilled hole or the like. The response of the safety clutch, which then occurs, is indicated by the integrated high-frequency transmission device; for the switch of the high-frequency transmission device is then closed so that, with the electric circuit now closed, a high-frequency output signal is generated and emitted via the external aerial ring of the chuck. The high-frequency signal may be of the order of, for example, between preferably 20 and 100 MHz. This output signal is received without contact and without wire by an associated high-frequency receiver and is processed therein into a signal so that, during the monitoring of the machine tool and the machining operation, it is possible to detect that the safety clutch has responded on the respective chuck and that there is a defect. For the rest, the illustrated chuck carries a sliding ring on the outside, which ring is moved due to the relative displacement between the shank and the sleeve when the safety clutch responds so that, when looking at the chuck, one can then also discern from the outside that the safety clutch has responded and note the dimension by which the depth of the drilled hole has not been fully reached.

The known chuck of the described kind has been well proven, particularly on multi-spindle drilling machines, on which a plurality of individual spindles, each provided with a chuck, is driven from a common drive on the machine. As regards the high-frequency transmission device, it has however turned out that this device is highly susceptible to trouble due to the penetration of moisture into the interior of the chuck, which results in incorrect signals or other malfunctions as well as total failures. This jeopardises the reliability of the chuck to a high degree.

Moisture can penetrate into the chuck interior at several points, for example at the chuck end which is accommodated in the zone of the spindle on the machine. There, the penetration of air and moisture is unavoidable. In addition, cooling emulsions and cutting solutions are used during machining, as is well known. These fluids tend to penetrate through minute holes and slots in the chuck. It is also possible for moisture to penetrate from the outside into the chuck interior over the longitudinal zone of the chuck. Since the shank and the sleeve are axially displaceable relative to each other, a sliding movability thus being provided and having to be provided between the two, there come about by this very fact slots and gaps, through which the moisture and fluid cannot fail to penetrate. Upon the axial compression of the shank and the sleeve, when the safety clutch responds, air contained in the interior is compressed. The system therefore resembles a gas spring. Due to this design, too, there is thus provided an exchange of air from the chuck interior to the outside and vice versa, which is indeed necessary. By this means, too, it is possible for moisture to pass into the chuck interior.

OBJECT OF THE INVENTION

The object of the invention is to provide a chuck which guarantees a high degree of reliability with respect to the high-frequency transmission device and which ensures, with the simplest possible means, as tight a sealing as possible of the chuck interior, at least of the internal chamber in which the sensitive parts of the high-frequency transmission device are contained.

SUMMARY OF THE INVENTION

According to the invention there is provided a chuck for drilling tools comprising a shank, which is hollow in its interior and which can be accommodated in a machine spindle, and having a sleeve, which is adapted for accommodating a quick change insert comprising a tool or for directly accommodating the tool and which is coupled with the shank through an adjustable torque clutch device which, in the event of an overload, automatically disengages along with an axial relative displacement of the shank and the sleeve, and having a high-frequency transmission device which is provided with a current source of its own, a high-frequency transmitter, a switch, which is closable during the axial relative movements between the shank and the sleeve, in the current supply circuit of the high-frequency transmitter and an external aerial ring, wherein the shank interior which contains the high-frequency transmission device including the current source, transmitter and switch is sealed in both axial end zones of the high-frequency transmission device, as well as at the aerial ring, which seats on the shank, over the exterior thereof.

Due to the moisture-proof hermetic enclosure of the internal chamber of the shank, which contains the high-frequency transmission device with all the sensitive parts, namely by the sealing of this internal chamber in the axial direction, it is ensured that no moisture can pass into this internal chamber and reach the sensitive parts of the high-frequency transmission device. Nor does this internal chamber participate in the compression of the air contained therein when the safety clutch responds and the shank and the sleeve are inserted one within the other. The moisture-proof hermetic enclosure of the aerial ring over its entire exterior ensures, here too, that neither fluid nor any other moisture can enter, which might otherwise cause incorrect signals. In addition, the design is particularly simple and thus relatively low in cost.

In most cases, a hermetic enclosure of the aerial ring by casting casting resin therearound is preferred.

Further features provide on the one hand, accessibility to the internal chamber containing the high frequency transmission device, for example in order to allow the battery block to be exchanged for a new one. On the other hand, when closing is effected by means of the closing cap, which is provided with a sealing washer or sealing ring, absolute sealing is ensured and the penetration of any moisture is prevented.

Preferably a closing cap at the other cavity end in the interior of the shank by the cover, preferably a diaphragm, ensures a this cavity end, too, an absolutely tight seal, which furthermore is relatively simple in construction and low in cost. Nevertheless, an actuation of the switch of the high-frequency transmission device is possible, thanks to the movability of the cover which constitutes a sealing interface between the switch part to be acted on in the enclosed internal chamber and an external switching part.

A switching stud may be located on the other side of the enclosed internal chamber, and may be adjustable with respect to its projecting length measured in the axial direction, thus allowing the switching point of the switch to be very accurately set. An overlift spring may be provided to absorb an overlift occurring upon the actuation of the switch until the mechanical stop is reached and at the same time permanently ensure that the electric contact is made between the battery block and the high-frequency transmitter, on the one hand, and between the latter and the electrically conductive housing of the switch, on the other hand.

BRIEF DESCRIPTION OF THE DRAWING

The invention will hereinafter be explained in more detail with reference to an exemplified embodiment which is shown in the accompanying drawing and depicts a diagrammatical axial longitudinal section of a chuck intended, more especially, for drilling tools.

DESCRIPTION OF PREFERRED EMBODIMENT

The chuck comprises a shank 10 which, in the upper part 11, is designed as an adjusting sleeve which has an internal cavity 12 and which can be accommodated in the usual way inside an indicated machine spindle 13. An adjusting nut 14 sits on the adjusting sleeve 11. The adjusting sleeve 11 of the shank 10 is integrally adjoined by a lower part 15 which also comprises an internal cavity 16 and plunges into a sleeve 17. The design of this chuck corresponds, for example, to that described in U.S. PS 40 90 802. The sleeve 17 serves, at its lower end, either for the direct accommodation of the tool, which is not shown in detail, for example a tap, or for the accommodation of a quick-change insert which is not shown and is also known and which, for its part, then holds the tool, for example a tap.

The shank 10 driven by the machine spindle 13 is coupled with the sleeve 17 through an adjustable torque clutch device 18 of known type which, in the event of overloading, automatically disengages the shank 10 from the sleeve 17 along with an axial relative displacement thereof. During this process, the sleeve 17 is pushed further onto the shank 10.

In the interior of the chuck, there is furthermore contained a high-frequency transmission device 19 which serves for the same purpose as that described in U.S. Pat. No. 4,090,802. When the torque clutch device 18 responds by way of disengaging, an electric circuit is closed in the high-frequency transmission device 19 so that there is generated and emitted a high-frequency signal which is received by a stationarily arranged high-frequency receiver, which is not shown in detail, and can be evaluated. In this way, a signal is thus generated when the torque clutch device 18 responds. The torque clutch device 18 serves as a safety device. It responds if a set feeding force is exceeded, which is the case, for example, if the drill is blunt or if the drilling depth of the drilled holes is insufficient or if the drilled holes are clogged by chips or the like. Due to the response of this safety device, a breakage of the drilling tool is prevented. The simultaneous generation of the high-frequency signal signalises the response of this safety device.

The high-frequency transmission device 19 has a battery 20 as its own current source in the cavity 12, and furthermore a high-frequency transmitter 21 in the cavity 12, and furthermore a switch 22, which is closable when the axial relative movement between the shank 10 and the sleeve 17 occurs, in the current supply circuit of the high-frequency transmitter 21 and furthermore an external aerial ring 23.

When the torque clutch device 18 responds and the sleeve 17 is moved further onto the shank 10, air which is contained in the interiors of the two parts and which seeks to escape to the outside is compressed. During the return movement, ambient air endeavours to penetrate into the interiors. It has therefore turned out that on known chunks of the species described so far moisture can reach, in particular, the individual components of the high-frequency transmission device 19, which may then lead to incorrect signals or to a complete failure.

In order to prevent the penetration of moisture, the shank 10 containing the high-frequency transmission device 19 with all its components in the cavity 12 is provided with a moisture-proof hermetic enclosure in both axial end zones of the high-frequency device 19. Furthermore, the aerial ring 23 sitting on the shank 10 is also provided, over its entire exterior, with a moisture-proof hermetic enclosure. The aerial ring 23 sits on the shank 10 with an insulating ring 24 placed therebetween. As the moisture-proof hermetic enclosure, plastics material, preferably cast resin, in the form of the visible external coating 25 has been cast around the aerial ring 23 over the entire exterior thereof. In this way, a completely hermetical seal is provided at this critical point and any penetration of moisture is prevented.

At the end which is at the top in the drawing, the cavity 12 in the shank 10 is closed by means of a closing cap 26, more especially in the form of a screw plug, which carries a sealing ring 27 or a sealing washer for sealing at that point. The sealing ring 27 or the sealing washer sealingly bears against the facing surfaces of the closing cap 26, on the one hand, and of the shank end, on the other hand, so that the penetration of moisture is reliably prevented there, too. At an axial distance therefrom and from the overlapping end of the sleeve 17, the internal cavity 12 in the shank 10 is axially enclosed in a likewise hermetical and liquid-tight manner. This is ensured by means of a movable cover 28 which is preferably constructed as a diaphragm which has been tightly clamped along the edges. The cover 28 is designed as a rotating body which is approximately M-shaped in an axial longitudinal section. Its external ring section bears, with its external circumferential surface, against the internal bounding wall of the cavity 16 in the lower part 15 of the shank 10. This ring section is sealingly pressed, with an axial face thereof, against an internal ring shoulder 29 in the shank 10. For this purpose, a pressure plate 30 bears against the cover 28 from the exterior of the enclosed cavity 12. This pressure plate is acted on by a compression spring 31 in the shape of a cylindrical helical spring which extends in the interior of the shank 10 and that of the sleeve 17 and which, with one end, which is directed away from the pressure plate 30, is axially supported on the sleeve 17.

The switch 22 contained in the cavity 12 in the shank 10 consists of a mechanically operating microswitch which is provided with an axial switching tappet 32 consisting off insulating material. The switch 22 is close to the end cover 28 and is so arranged that its switching tappet 32 bears, with its free front end, against the cover 28.

The housing of the switch 22 consists of an electrically conductive material. It is received in an insulating bush 33 within the cavity 12. By this means, the switch housing is insulated against short-circuiting relative to the shank 10. In the zone of the switching tappet 32, the insulating bush 33 comprises, in its exterior, an aerial bush 34 consisting of an electrically conductive material. The housing of the switch 22 is kept in electrically conductive contact with the latter by means of axial contact surfaces. As is discernible, only small face portions of the housing of the switch 22 can come into contact with the front end of the aerial bush 34. In order to ensure reliable contact making, even if small clearances and incorrect contacts should come about there, there is provided between the housing of the switch 22 and the aerial bush 34 a compression spring 35 in the form of a cylindrical helical spring, which consists of an electrically conductive material.

The aerial bush 34 has a guide hole 36 in its centre, through which the switching tappet 32 of the switch 22 passes.

The external aerial ring 23 is fixed, for example, by means of three radial screws 37 consisting of an electrically conductive material. Each screw 37 passes through an associated radial hole 38 in the shank 10, which hole is lined with an insulating bush 39. Endwise, each screw 37 extends into the aerial bush 34 so that the conductive connection from the aerial bush 34 to the aerial ring 23 is established there.

The high-frequency transmission device 19 furthermore comprises two indicated resilient contact tongues 40, 41, only one of which may be sufficient. For the collection of current, the contact tongues 40, 41 bear against the internal bounding wall of the cavity 12, which wall may be nickel- or chromium-plated so as to increase the contact-making. With the switch 22 closed, there flows a current from the battery block 20 via the closing cap 26, the shank 10, the contact tongues 40, 41 to the high-frequency transmission device 19 and from this device back to the battery block 20. A high-frequency signal is generated and is emitted to the outside by the aerial ring 23.

Associated with the switch 22 is a switching stud 51 which is located in the cavity 16 in the shank 10. The switching stud 51 is supported relative to the sleeve 17 and, with its stud end which is directed towards the cover 28 and acts via the cover 28 on the switching tappet 32 for the actuation of the switch 22, is guided in the pressure plate 30. In the state shown, in which the switch 22 is not closed, the free front end of the switching stud 51 is at a specified distance rom the cover 28. The switching stud 51 carries a radial stop shoulder 52, for example a ring which is integral therewith and which is provided at the specified distance from the free front end of the switching stud 51 and which, for the limitation of the axial switch actuating lift, strikes against the pressure plate 30. The switching stud 51 is provided with a thread 53 and is screwed into a socket 55, which is provided with a thread 54, so as to be adjustable with respect to its axial projecting length, thus setting the switching point of the switch 22. In order to secure its screwed-in position, the switching stud 51 carries a lock nut 56 on its threaded lug 53.

In the shank 10 and in the sleeve 17, there is contained a telescopic sleeve which consists of two individual sleeve elements, of which the upper sleeve element forms the socket 55 and is insertable into a lower sleeve element 57 in a telescope-like manner. The two sleeve elements 55 and 57 are forced into their extended positions by means of an axial compression spring 58. The compression spring 31, which acts on the pressure plate 30, is supported, with its opposite end, on a base flange 59 of the lower sleeve element 57. The base flange 59, for its part, sits on a bottom wall 60 in the sleeve 17.

Furthermore arranged in the cavity 12 in the shank 10 is an axial overlift spring 61 which, with its upper end, bears against a front-end contact surface of the battery block 20 and, with its opposite end, is kept in electrically conductive contact with a contact surface 62 of the high-frequency transmission device 19. The overlift spring 61 absorbs the axial overlift which is travelled through during the relative displacement of the switching stud 51 after the closing of the switch until the position in which the stop shoulder 52 strikes against the pressure plate 30 for limiting any further lift is reached.

If, for example in the event of a breakage of the drilling tool, the torque clutch device 18 responds and interrupts the rotary drive of the sleeve 17, which drive was until then brought about by the driven shank 10, then an axial relative displacement between the shank 10 and the sleeve 17 comes about in such a way that the shank 10 plunges more deeply into the sleeve 17. The switching stud 51 then axially strikes against the switching tappet 32 by means of the elastic cover 28 until the switch 22 is closed. Then, the electric circuit of the high-frequency transmission device 19 is closed. A high-frequency signal is emitted via the aerial ring 23. As the shank 10 moves further downwards, the overlift spring 61 is slightly compressed, which spring absorbs any lift that comes about and simultaneously ensures that the high-frequency transmission device 19, with its end that is at the bottom in the drawing, still remains in electrically conductive contact with the housing of the switch 22 and this switch, in turn, supported by the compression spring 35, remains in electrically conductive contact with the aerial bush 34. As the axial movement continues, the stop shoulder 52 strikes against the pressure plate 30 so that the switching contacts of the switch 22 are now relieved and no longer have to absorb any further overlifting force.

Of special advantage is the simple and extremely reliable design providing a moisture-proof hermetical enclosure of the entire interior in which the high-frequency transmission device 19 is located, including the external enclosure of the aerial ring 23. Thus, it is ensured that it is impossible for any moisture to penetrate, which might lead to incorrect signalling or even to a complete destruction. Consequently, a high degree of reliability and permanent readiness for operation is ensured. The adjustability of the switching stud 51 allows the switching point of the switch 22 to be sensitively and accurately set, and this with extremely simple means. The volume to be compressed or even to be completely displaced during the relative insertion of the shank 10 and the sleeve 17 into each other is extremely small. It is specified by the air space which is enclosed between the cover 28, on the one hand, and the front end of the aerial bush 34, on the other hand.

We claim:

1. A chuck for drilling tools comprising:
   a. a shank which is hollow in its interior and which can be accommodated in a machine spindle,
   b. a sleeve which is adapted for accommodating a quick change insert,
   c. an adjustable torque clutch device arranged between said shank and said sleeve which torque device, in the event of an overload, automatically disengages along with an axial relative displacement between the shank and the sleeve,
   d. and a high frequency transmission device within said shank interior, said high-frequency transmission device including
   e. a current source of its own,
   f. a high-frequency transmitter,
   g. an aerial ring, which seeds on the shank, over the exterior thereof,
   h. and a switch, which is closable during the axial relative movement between the shank and the sleeve, and the current supply circuit of the high-frequency transmitter and the external aerial ring, said chuck further including:
   i. means for sealing the shank interior at both axial end zones of the high frequency transmission device to hermetically seal the latter, wherein said sealing means includes a cast around the exterior of the aerial ring to effect moisture-proof hermetic sealing, and one end of said shank interior being sealed by a screw plug which seals by means of a sealing ring and the other end of said shank interior being sealed by a movable uninterrupted flexible diaphragm cover which is tightly clamped against a portion of the interior of the shank for axially hermetically enclosing the interior in a zone that is provided at an axial distance from the free sleeve end.

2. A chuck according to claim 1, wherein the sealing means includes an insulating ring placed between the aerial ring and shank.

3. A chuck according to claim 1, wherein the sealing ring sealingly bears against axial, facing surfaces of the shank and the closing cap.

4. A chuck according to claim 1, wherein the cover is designed as a body of rotation which is approximately M-shaped in a longitudinal section, the external ring section thereof, with its external circumferential surface, bearing against the internal bounding wall of the cavity and, with an axial face, being sealingly pressed against an internal ring shoulder in the shank.

5. A chuck according to claim 1, wherein there bears against the cover, from the exterior of the enclosed cavity, a pressure plate, on which a compression spring acts, which extends in the interior of the shank as well as that of the sleeve and, with its end that is directed away from the pressure plate, is axially supported on the sleeve.

6. A chuck according to claim 1, wherein the switch contained in the interior of the shank is designed as a mechanical microswitch provided with an axial switching tappet, the switch being arranged close to the cover and in such a way that the switching tappet bears with its free front end against the cover.

7. A chuck according to claim 6, wherein the switch housing consists of an electrically conductive material and is accommodated in an insulating bush in the cavity in the shank, and in that the insulating bush comprises, in the zone of the switching tappet, an aerial bush which consists of an electrically conductive material and with which the switch housing is kept in an electrically conductive contact by means of axial contact surfaces.

8. A chuck according to claim 7, wherein an electrically conductive compression spring is arranged between the switch housing and the aerial bush.

9. A chuck according to claim 7, wherein the aerial bush has in its centre a guide hole, through which the switching tappet, which is formed by insulating material, passes for the guidance thereof.

10. A chuck according to claim 1, wherein the aerial ring is fixed by means of radial screws which consists of an electrically conductive material and which pass through radial holes in the shank, which holes are lined with insulating bushes, and which, endwise, extend into the aerial bush.

11. A chuck according to claim 1, wherein the high-frequency transmission device has at least one resilient contact tongue which, for the collection of current from the shank, bears against the internal bounding wall of the cavity thereof.

12. A chuck according to claim 11, wherein the internal wall is plated with one metal selected from nickel and chromium so as to increase the contact conduction.

13. A chuck according to claim 1, having a switching stud which is provided in the interior of the shank and which is supported in the sleeve and, with its stud end that faces the cover and acts on the switching tappet through the cover for the actuation of the switch, passes through the pressure plate and is guided therein.

14. A chuck according to claim 13, wherein the switching stud carries a radial stop shoulder, for example a ring, which is arranged at a specified distance from the free front end of the switching stud, and for limiting the axial switch actuating lift, strikes against the pressure plate.

15. A chuck according to claim 13, wherein the switching stud is provided with a thread and, with respect to its axial projecting length, is adjustably screwed into a socket, thus setting the switching point of the switch.

16. A chuck according to claim 15, wherein the switching stud carries a lock nut on its threaded lug.

17. A chuck according to claim 1, wherein in the shank and in the sleeve there is contained a telescopic sleeve, the individual sleeve elements of which are forced into their extended positions by means of an axial compression spring, the sleeve element pointing towards the switch being provided with an internal thread and carrying the switching stud screwed thereinto.

18. A chuck according to claim 5, wherein the compression spring acting on the pressure plate is supported, with its opposite end, on a base flange of the telescopic sleeve, which flange sits on a bottom wall in the sleeve.

19. A chuck according to claim 1, having an axial overlift spring in the cavity in the shank, which spring, with one end, bears against a front-end contact surface of the current source, more especially a battery, and, with its other end, is kept in electrically conductive contact with a contact surface of the high-frequency transmission device.

20. A chuck according to claim 1, wherein the cast is of plastic material.

21. A chuck according to claim 20, wherein the cast is cast resin.

* * * * *